(12) United States Patent
Nomura et al.

(10) Patent No.: US 12,025,574 B2
(45) Date of Patent: Jul. 2, 2024

(54) CORRECTION METHOD, CORRECTION APPARATUS, RADIOGRAPHY SYSTEM, AND CORRECTION PROGRAM

(71) Applicant: FUJIFILM Corporation, Tokyo (JP)

(72) Inventors: Kengo Nomura, Tokyo (JP); Yasunori Narukawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 377 days.

(21) Appl. No.: 17/370,082

(22) Filed: Jul. 8, 2021

(65) Prior Publication Data
US 2021/0334940 A1 Oct. 28, 2021

Related U.S. Application Data

(63) Continuation of application No. PCT/JP2020/004897, filed on Feb. 7, 2020.

(30) Foreign Application Priority Data

Feb. 28, 2019 (JP) .................. 2019-035269

(51) Int. Cl.
*G01N 23/04* (2018.01)
*G01N 23/087* (2018.01)
(Continued)

(52) U.S. Cl.
CPC ............. *G01N 23/18* (2013.01); *G01N 23/04* (2013.01); *G01N 23/043* (2013.01);
(Continued)

(58) Field of Classification Search
CPC .... G01N 23/04; G01N 23/043; G01N 23/083; G01N 23/087; G01N 23/10; G01N 23/12;
(Continued)

(56) References Cited

U.S. PATENT DOCUMENTS 3,835,324 A * 9/1974 Weigle .................. G01N 23/18
250/363.01
5,177,779 A * 1/1993 Cornu .................. G01N 23/04
378/205
(Continued)

FOREIGN PATENT DOCUMENTS

CN 103180757 A 6/2013
CN 104685374 A 6/2015
(Continued)

OTHER PUBLICATIONS

Written opinion of the International Searching Authority dated Apr. 14, 2020, in International Application No. PCT/JP2020/004897.
(Continued)

*Primary Examiner* — Allen C. Ho
(74) *Attorney, Agent, or Firm* — Sughrue Mion, PLLC (57) ABSTRACT

A correction apparatus includes an acquisition unit that acquires first image data representing a radiographic image generated by the radiation detector which is irradiated with the radiation in a state of being provided on a portion of an object to be inspected different from a portion to be inspected so as to be bent along an outer shape of the object to be inspected, and a correction unit that generates correction data on the basis of the first image data and corrects second image data representing the radiographic image generated by the radiation detector which is irradiated with the radiation in a state of being provided on the portion to be inspected so as to be bent along the outer shape of the object to be inspected.

14 Claims, 8 Drawing Sheets

(51) Int. Cl.
  *G01N 23/18* (2018.01)
  *G06T 5/50* (2006.01)
  *G06T 5/70* (2024.01)
(52) U.S. Cl.
  CPC ............. *G01N 23/087* (2013.01); *G06T 5/50* (2013.01); *G06T 5/70* (2024.01); *G01N 2223/401* (2013.01); *G01N 2223/628* (2013.01); *G01N 2223/646* (2013.01); *G06T 2207/10116* (2013.01); *G06T 2207/30136* (2013.01)
(58) Field of Classification Search
  CPC ............... G01N 23/18; G01N 2223/04; G01N 2223/1013; G01N 2223/1016; G01N 2223/401; G01N 2223/628; G01N 2223/646; G01N 2223/6462; G01N 2223/6466
  USPC .......................................... 378/58, 59, 62, 63
  See application file for complete search history.

(56) References Cited

U.S. PATENT DOCUMENTS

| | | | | |
|---|---|---|---|---|
| 5,420,427 A * | 5/1995 | Morgan | ................. | G01N 23/18 250/358.1 |
| 7,885,381 B2 * | 2/2011 | Nagumo | ............. | G01N 23/046 378/59 |
| 8,693,613 B2 * | 4/2014 | Bueno | ................... | G01N 23/04 376/450 |
| 8,759,780 B2 * | 6/2014 | Dobbs | ................... | G01B 15/02 250/360.1 |
| 9,050,051 B2 * | 6/2015 | Nakatsugawa | ...... | A61B 6/4233 |
| 9,217,720 B2 * | 12/2015 | Prentice | .............. | G01N 23/083 |
| 9,524,546 B2 * | 12/2016 | Nagashima | ............ | G06T 7/001 |
| 9,753,150 B2 * | 9/2017 | Nygard | .................. | G01N 23/18 |
| 9,897,558 B2 * | 2/2018 | Bowdon | ............. | G01T 1/20185 |
| 10,067,076 B2 * | 9/2018 | Ronchi | ................ | G01N 23/046 |
| 10,140,701 B2 | 11/2018 | Yamahana et al. | | |
| 10,168,288 B2 * | 1/2019 | Bueno | .................. | G01N 23/087 |
| 10,429,324 B2 * | 10/2019 | Phin | ....................... | G01N 23/18 |
| 10,697,905 B2 * | 6/2020 | Featonby | .......... | G01N 23/20066 |
| 10,732,131 B2 * | 8/2020 | Schmitz | ............... | G01N 23/04 |
| 11,733,182 B2 * | 8/2023 | May | ........................ | G01N 23/04 378/59 |
| 2014/0061496 A1 | 3/2014 | Nakatsugawa et al. | | |
| 2015/0192684 A1 | 7/2015 | Ito | | |
| 2015/0235357 A1 | 8/2015 | Nagashima et al. | | |
| 2016/0370303 A1 | 12/2016 | Schmitz et al. | | |

FOREIGN PATENT DOCUMENTS

| | | |
|---|---|---|
| CN | 104780844 A | 7/2015 |
| JP | 49019890 A | 2/1974 |
| JP | 3210412 A | 9/1991 |
| JP | 9114026 A | 5/1997 |
| JP | 2010204060 A | 9/2010 |
| JP | 2012-187220 A | 10/2012 |
| JP | 2014102202 A | 6/2014 |
| JP | 2015203574 A | 11/2015 |
| WO | 2010/100969 A1 | 9/2010 |

OTHER PUBLICATIONS

International Preliminary Report on Patentability with translation of Written Opinion dated Aug. 25, 2021, in International Application No. PCT/ JP2020/004897.

International Search Report dated Apr. 14, 2020, in International Application No. PCT/JP2020/004897.

Chinese Office Action dated Aug. 11, 2023 in Application No. 202080012023.8.

* cited by examiner

CORRECTION METHOD, CORRECTION APPARATUS, RADIOGRAPHY SYSTEM, AND CORRECTION PROGRAM

CROSS-REFERENCE TO RELATED APPLICATIONS

This application is a Continuation of PCT International Application No. PCT/JP2020/004897 filed on Feb. 7, 2020, which claims priority under 35 U.S. § 119(a) to Japanese Patent Application No. 2019-035269 filed on Feb. 28, 2019. Each of the above application(s) is hereby expressly incorporated by reference, in its entirety, into the present application.

BACKGROUND OF THE INVENTION

1. Field of the Invention

The present disclosure relates to a correction method, a correction apparatus, a radiography system, and a correction program.

2. Description of the Related Art

In the related art, non-destructive inspection using radiation has been performed. As a technique related to the non-destructive inspection, disclosed is a technique of emitting radiation from a radiation source in a state in which a radiation detection medium is disposed on the outer periphery of a welded portion of a pipe to be inspected and the radiation source is disposed on the central axis of the pipe, and acquiring a reference fluoroscopic image generated by the radiation detection medium (see JP2014-102202A).

In this technique, a reference density profile showing a relationship between the coordinates and the density value of the reference fluoroscopic image in the outer peripheral direction of the pipe is generated on the basis of the reference fluoroscopic image. Further, in this technique, radiation is emitted from a radiation source in a state in which the radiation source is disposed inside the pipe, and a weld inspection fluoroscopic image generated by the radiation detection medium is acquired. Further, in this technique, curve approximation is performed on a change in the density value in the outer peripheral direction of the pipe in the weld inspection fluoroscopic image, whereby a weld inspection density profile is generated. Then, in this technique, arithmetic operation for correction information for correcting the density unevenness of the weld inspection fluoroscopic image is performed on the basis of the reference density profile and the weld inspection density profile.

SUMMARY OF THE INVENTION

Incidentally, in the technique of JP2014-102202A, the curve approximation is performed to generate the weld inspection density profile in order to obtain the correction information. In addition, it may take some time to dispose the radiation source on the central axis of the pipe to be inspected. Accordingly, the correction information cannot be easily obtained.

The present disclosure has been made in view of the above circumstances, and an object thereof is to provide a correction method, a correction apparatus, a radiography system, and correction program by which correction data for correcting a radiographic image generated by a radiation detector can be easily generated.

In order to achieve the above object, a correction method according to the present disclosure of correcting a radiographic image generated by a radiation detector that detects radiation with which a portion to be inspected of an object to be inspected is irradiated and which is transmitted through the object to be inspected, the method comprises acquiring first image data representing the radiographic image generated by the radiation detector which is irradiated with the radiation in a state of being provided on a portion of the object to be inspected different from the portion to be inspected so as to be bent along an outer shape of the object to be inspected; and generating correction data on the basis of the first image data and correcting second image data representing the radiographic image generated by the radiation detector which is irradiated with the radiation in a state of being provided on the portion to be inspected so as to be bent along the outer shape of the object to be inspected.

The correction method according to the present disclosure may further comprise acquiring the second image data; and correcting the second image data by using the correction data.

In the correction method according to the present disclosure, the correction data may be a ratio of an ideal value to a pixel value of the first image data.

In the correction method according to the present disclosure, the correction data may be data representing a difference in pixel value of the first image data based on a difference in distance from the radiation source in each pixel of the radiation detector.

In the correction method according to the present disclosure, the ideal value of the pixel value of the first image data may be a value between a maximum value and a minimum value.

Further, a correction apparatus according to the present disclosure that corrects a radiographic image generated by a radiation detector that detects radiation with which a portion to be inspected of an object to be inspected is irradiated and which is transmitted through the object to be inspected, the apparatus comprises an acquisition unit that acquires first image data representing the radiographic image generated by the radiation detector which is irradiated with the radiation in a state of being provided on a portion of the object to be inspected different from the portion to be inspected so as to be bent along an outer shape of the object to be inspected; and a correction unit that generates correction data on the basis of the first image data and corrects second image data representing the radiographic image generated by the radiation detector which is irradiated with the radiation in a state of being provided on the portion to be inspected so as to be bent along the outer shape of the object to be inspected.

Further, a radiography system according to the present disclosure comprises a radiation detector in which a plurality of pixels each of which outputs an electrical signal according to an amount of emitted radiation are arranged; and the correction apparatus according to the present disclosure.

In the radiography system according to the present disclosure, each of the plurality of pixels may include a conversion element that generates a larger amount of electric charge as the amount of emitted radiation becomes larger, and a switching element that outputs the electric charge generated by the conversion element as the electrical signal.

Further, a correction program according to the present disclosure that causes a correction apparatus that corrects a radiographic image generated by a radiation detector that detects radiation with which a portion to be inspected of an object to be inspected is irradiated and which is transmitted through the object to be inspected, to execute a process, the process comprises acquiring first image data representing the radiographic image generated by the radiation detector which is irradiated with the radiation in a state of being provided on a portion of the object to be inspected different from the portion to be inspected so as to be bent along an outer shape of the object to be inspected; and generating correction data on the basis of the first image data and correcting second image data representing the radiographic image generated by the radiation detector which is irradiated with the radiation in a state of being provided on the portion to be inspected so as to be bent along the outer shape of the object to be inspected.

Further, a correction apparatus according to the present disclosure comprises a memory that stores a command for causing a computer that corrects a radiographic image generated by a radiation detector that detects radiation with which a portion to be inspected of an object to be inspected is irradiated and which is transmitted through the object to be inspected, to perform execution; and a processor configured to execute the stored command, in which the processor acquires first image data representing the radiographic image generated by the radiation detector which is irradiated with the radiation in a state of being provided on a portion of the object to be inspected different from the portion to be inspected so as to be bent along an outer shape of the object to be inspected; and generates correction data on the basis of the first image data and corrects second image data representing the radiographic image generated by the radiation detector which is irradiated with the radiation in a state of being provided on the portion to be inspected so as to be bent along the outer shape of the object to be inspected.

According to the present disclosure, correction data for correcting a radiographic image generated by a radiation detector can be easily generated.

DESCRIPTION OF THE PREFERRED EMBODIMENTS

Hereinafter, an example of an embodiment of the technique according to the present disclosure will be described in detail with reference to the drawings.

Figure 1:
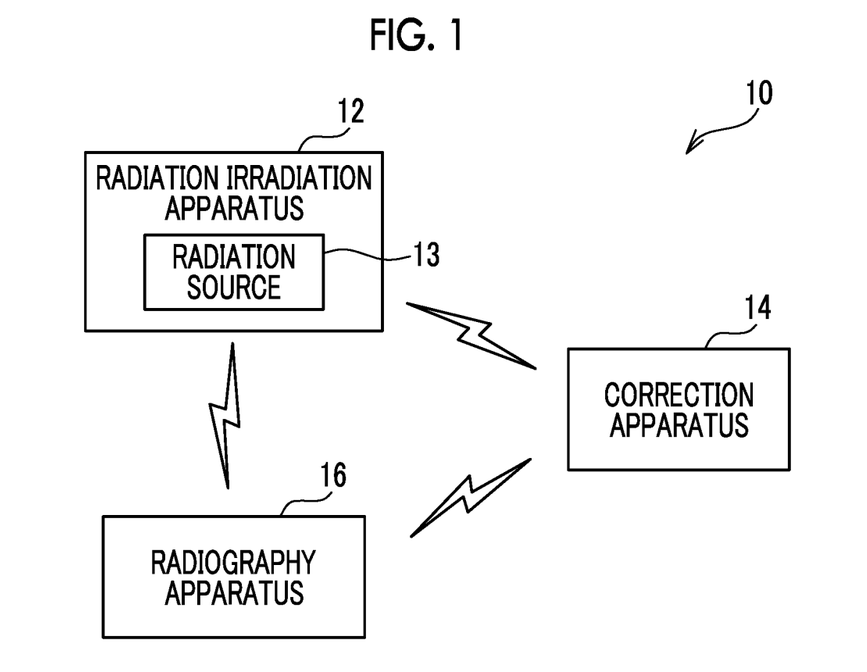
FIG. 1 is a block diagram showing an example of a configuration of a radiography system according to an embodiment.

First, the configuration of a radiography system 10 used in the non-destructive inspection according to the present embodiment will be described with reference to FIG. 1. As shown in FIG. 1, the radiography system 10 comprises a radiation irradiation apparatus 12, a correction apparatus 14, and a radiography apparatus 16. Examples of the correction apparatus 14 include a mobile terminal such as a laptop computer.

The radiation irradiation apparatus 12 comprises a radiation source 13 that emits radiation such as X-rays. The radiation irradiation apparatus 12, the correction apparatus 14, and the radiography apparatus 16 can transmit and receive information to and from one another through wireless communication.

Figure 2:
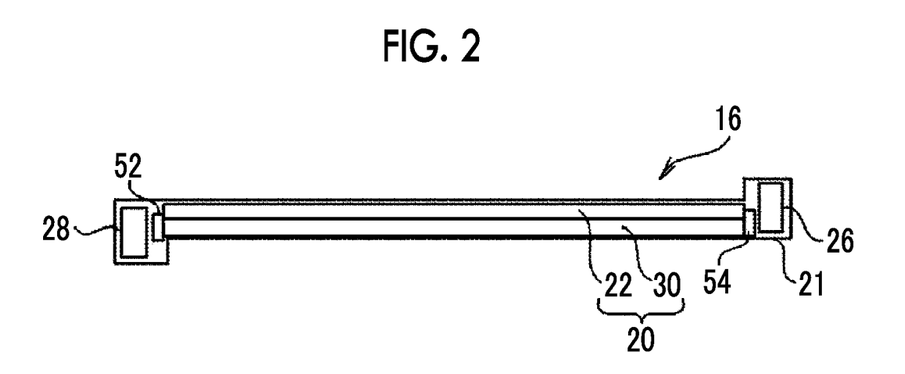
FIG. 2 is a side cross-sectional view showing an example of a configuration of a radiography apparatus according to the embodiment.

Next, the configuration of the radiography apparatus 16 according to the present embodiment will be described with reference to FIG. 2. As shown in FIG. 2, the radiography apparatus 16 comprises a housing 21 through which radiation is transmitted, and a radiation detector 20 that detects radiation transmitted through an object to be inspected is provided in the housing 21. Further, a control substrate 26, a case 28, a gate line driver 52, and a signal processing unit 54 are provided in the housing 21.

The radiation detector 20 comprises a scintillator 22 as an example of a light emitting layer that is irradiated with radiation and emits light, and a thin film transistor (TFT) substrate 30. Further, the scintillator 22 and the TFT substrate 30 are laminated in the order of the scintillator 22 and the TFT substrate 30 from the radiation incidence side. That is, the radiation detector 20 is a penetration side sampling (PSS) type radiation detector in which radiation is emitted from the scintillator 22 side. The scintillator 22 according to the present embodiment contains gadolinium oxysulfide (GOS).

The case 28 and the gate line driver 52 are provided on the opposite lateral side of the radiation detector 20 from the control substrate 26 and the signal processing unit 54 with the radiation detector 20 interposed therebetween. The case 28 and the gate line driver 52, and the control substrate 26 and the signal processing unit 54 may be provided on the same lateral side of the radiation detector 20.

In the control substrate 26, electronic circuits such as an image memory 56, a controller 58, and a communication unit 66, which will be described later, are formed on the control substrate 26. The case 28 houses a power supply unit 70 and the like, which will be described later.

Next, the configuration of a main part of an electrical system of the radiography apparatus 16 according to the present embodiment will be described with reference to FIG. 3.

Figure 3:
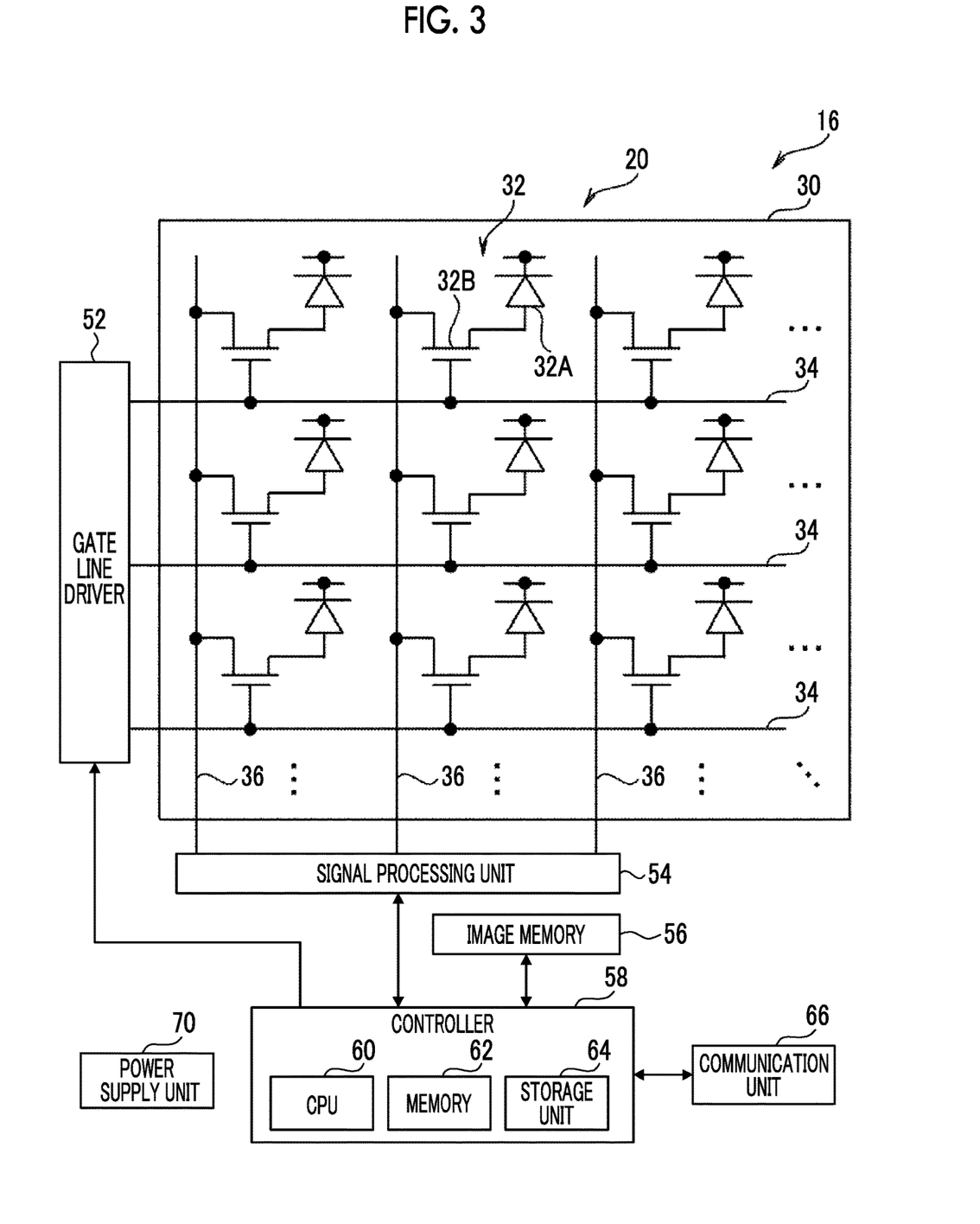
FIG. 3 is a block diagram showing an example of a configuration of a main part of an electrical system of the radiography apparatus according to the embodiment.

As shown in FIG. 3, a plurality of pixels 32 are two-dimensionally provided on the TFT substrate 30 in one direction (a row direction in FIG. 3) and in a cross direction (a column direction in FIG. 3) intersecting the one direction. The pixel 32 includes a sensor unit 32A and a field-effect thin film transistor (TFT, hereinafter simply referred to as a "thin film transistor") 32B.

The sensor unit 32A includes, for example, an upper electrode, a lower electrode, and a photoelectric conversion film which are not shown, absorbs the light emitted from the scintillator 22, generates electric charge, and accumulates the generated electric charge. The thin film transistor 32B converts the electric charge accumulated in the sensor unit 32A into an electrical signal and outputs the electrical signal. The sensor unit 32A is an example of a conversion element that generates a larger amount of electric charge as the amount of emitted radiation (hereinafter referred to as a "radiation amount") becomes larger. Further, the thin film transistor 32B is an example of a switching element that outputs the electric charge generated in the sensor unit 32A as an electrical signal.

A plurality of gate lines 34 which extend in the one direction and are used to turn each thin film transistor 32B on and off are provided on the TFT substrate 30. In addition, a plurality of data lines 36 which extend in the cross direction and are used to read out the electric charge through the thin film transistors 32B in an on state are provided on the TFT substrate 30. Each gate line 34 of the TFT substrate 30 is connected to the gate line driver 52 and each data line 36 of the TFT substrate 30 is connected to the signal processing unit 54.

The rows of the thin film transistors 32B of the TFT substrate 30 are sequentially turned on by the electrical signals which are supplied from the gate line driver 52 through the gate lines 34. Then, the electric charge read out by the thin film transistor 32B in an on state is transmitted as an electrical signal through the data line 36 and is received to the signal processing unit 54. In this way, the electric charge is sequentially read out from each row of the thin film transistors 32B and image data showing a two-dimensional radiographic image is acquired.

The signal processing unit 54 comprises an amplifier circuit that amplifies the received electrical signal, and a sample-and-hold circuit (both not shown) for each data line 36, and the electrical signal transmitted through each data line 36 is amplified by the amplifier circuit and is then held by the sample-and-hold circuit. A multiplexer and an analog-to-digital (AD) converter are connected to the output side of the sample-and-hold circuit in this order. The electrical signals held by each sample-and-hold circuit are sequentially (serially) received to the multiplexer and the electrical signals sequentially selected by the multiplexer are converted into digital image data by the AD converter.

The controller 58 which will be described later is connected to the signal processing unit 54, and the image data output from the AD converter of the signal processing unit 54 is sequentially output to the controller 58. The image memory 56 is connected to the controller 58, the image data sequentially output from the signal processing unit 54 is sequentially stored in the image memory 56 under the control of the controller 58. The image memory 56 has storage capacity capable of storing a predetermined amount of image data, and each time a radiographic image is captured, the captured image data is sequentially stored in the image memory 56.

The controller 58 comprises a central processing unit (CPU) 60, a memory 62 including, for example, a read only memory (ROM) and a random access memory (RAM), and a non-volatile storage unit 64 such as a flash memory. An example of the controller 58 is a microcomputer.

A communication unit 66 is connected to the controller 58 and transmits and receives various kinds of information to and from external apparatuses, such as the radiation irradiation apparatus 12 and the correction apparatus 14, which will be described later, by wireless communication. The power supply unit 70 supplies power to each of the above-mentioned various circuits and elements, such as the gate line driver 52, the signal processing unit 54, the image memory 56, the controller 58, and the communication unit 66. In FIG. 3, in order to avoid complications, lines for connecting the power supply unit 70 to various circuits or elements are not shown.

The base material of the TFT substrate 30 according to the present embodiment is a resin sheet having flexibility and containing, for example, a plastic such as polyimide (PI). The thickness of the base material of the TFT substrate 30 may be a thickness capable of obtaining a desired flexibility according to the hardness of the material, the size of the TFT substrate 30, and the like. The thickness of the resin sheet may be, for example, 5 μm to 125 μm, more preferably 20 μm to 50 μm. Specific examples of the resin sheet include XENOMAX (registered trademark).

Figure 4:
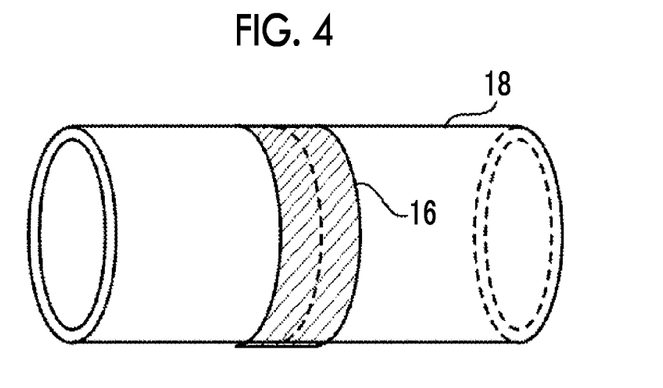
FIG. 4 is a diagram showing an example of a state in which the radiography apparatus according to the embodiment is provided on an object to be inspected.
Figure 5:
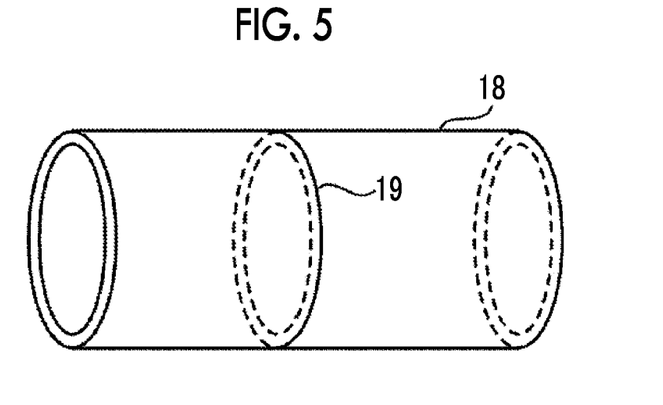
FIG. 5 is a diagram for explaining the object to be inspected and a portion to be inspected according to the embodiment.

Further, the scintillator 22 and the portion of the housing 21 facing the detection surface of the radiation detector 20 according to the present embodiment also have flexibility as in the TFT substrate 30. Therefore, as shown in FIG. 4 as an example, the radiography apparatus 16 can be provided on the object to be inspected 18 in a state of being bent along the outer shape of the object to be inspected 18. In the present embodiment, as shown in FIG. 5, a cylindrical object such as a pipe of a natural gas pipeline is applied as the object to be inspected 18 for non-destructive inspection, and an example of the embodiment to which a welded portion of two pipes is applied as a portion to be inspected 19 will be described.

Figure 6:
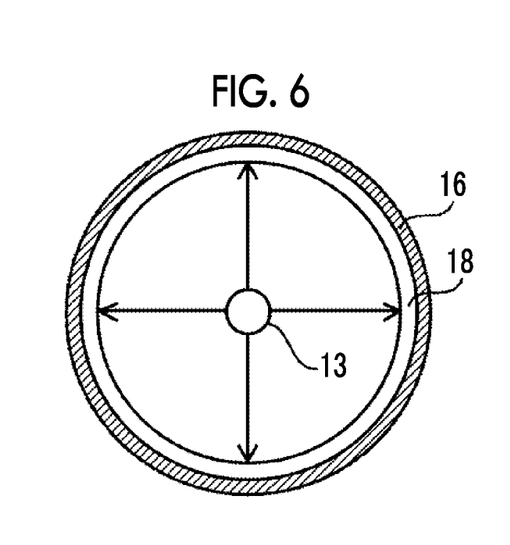
FIG. 6 is a cross-sectional view showing an example of a position of a radiation source in a cross-section along a radial direction of the object to be inspected according to the embodiment.

Meanwhile, a case of performing non-destructive inspection in a state in which the radiography apparatus 16 is provided on the object to be inspected 18 in a state of being bent along the outer shape of the object to be inspected 18, and the radiation irradiation apparatus 12 is disposed inside the object to be inspected 18, is considered as an example. In this case, as shown in FIG. 6, in a case where the radiation source 13 is disposed at the center in the cross-section along the radial direction of the object to be inspected 18, the distances from the radiation source 13 to each pixel 32 of the radiation detector 20 are the same, which is preferable. In this case, in a case where the object to be inspected 18 has no defects such as scratches, the density of the radiographic image generated by the radiation detector 20 according to the amount of radiation that has transmitted through the object to be inspected 18 and reached the radiation detector 20 is constant regardless of the pixel position along the outer peripheral direction of the object to be inspected 18.

Figure 7:
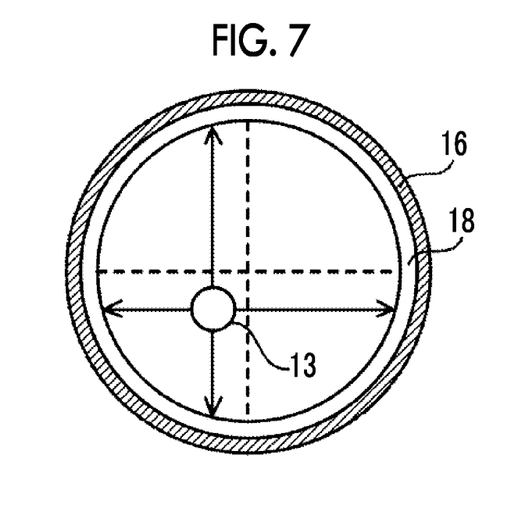
FIG. 7 is a cross-sectional view showing another example of the position of the radiation source in the cross-section along the radial direction of the object to be inspected according to the embodiment.

However, as shown in FIG. 7, the position of the radiation source 13 may deviate from the center in the cross-section along the radial direction of the object to be inspected 18 due to the shape of the inner wall surface of the object to be inspected 18 and the like. In this case, the distances from the radiation source 13 to each pixel 32 of the radiation detector 20 are different from each other. As a result, density unevenness caused by the difference in distance occurs in the radiographic image generated by the radiation detector 20 according to the amount of radiation which has transmitted through the object to be inspected 18 and reached the radiation detector 20 even in a case where the object to be inspected 18 has no defects such as scratches. Then, since the density unevenness is mixed with the density unevenness generated due to the defect of the object to be inspected 18, the defect of the object to be inspected 18 may not be detected accurately.

Therefore, the correction apparatus 14 according to the present embodiment has a function of generating correction data for correcting density unevenness caused by the difference in distance from the radiation source 13 to each pixel 32 of the radiation detector 20.

Figure 8:
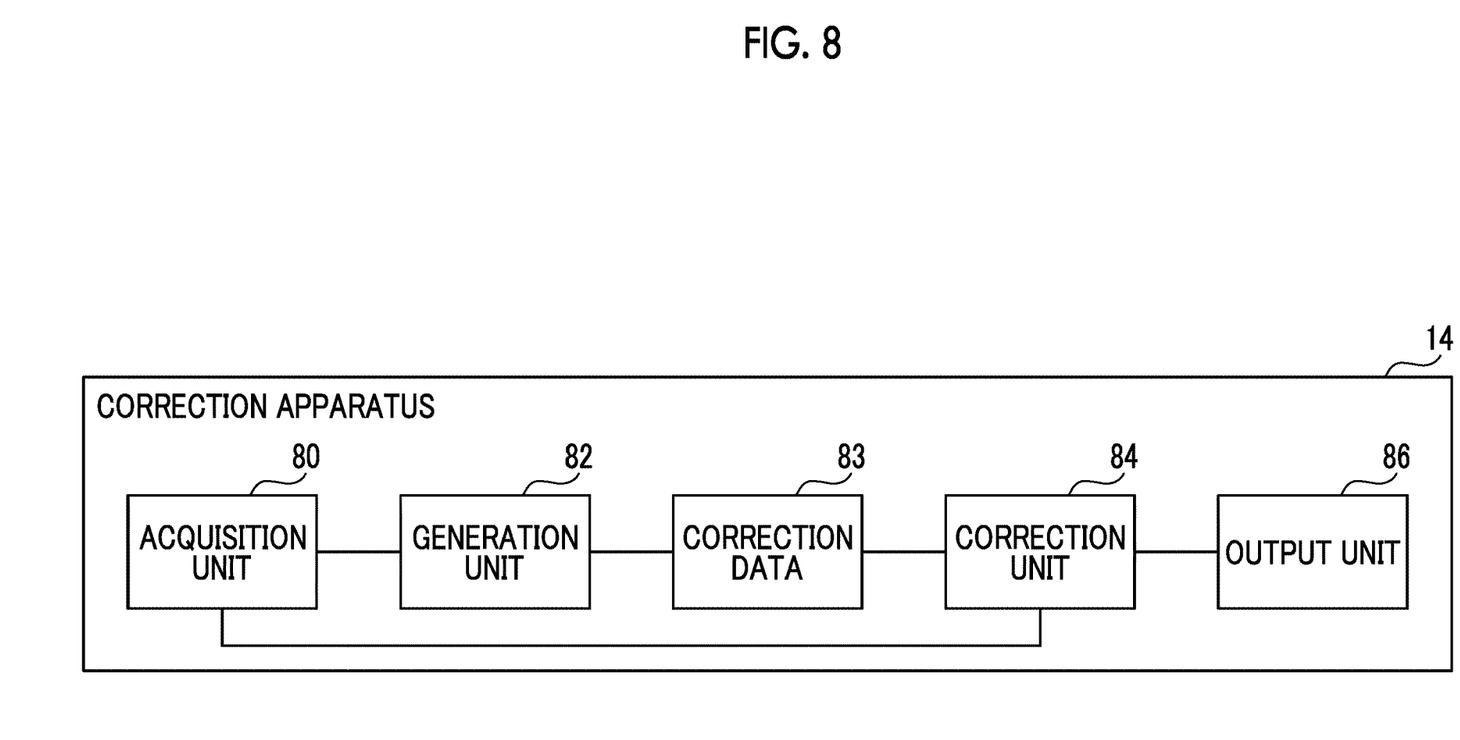
FIG. 8 is a block diagram showing an example of a functional configuration of a correction apparatus according to the embodiment.

Next, the functional configuration of the correction apparatus 14 according to the present embodiment will be described with reference to FIG. 8. As shown in FIG. 8, the correction apparatus 14 includes an acquisition unit 80, a generation unit 82, a correction unit 84, and an output unit 86.

The acquisition unit 80 acquires image data (hereinafter referred to as "first image data") representing a radiographic image generated by the radiography apparatus 16 which is irradiated with radiation in a state of being provided on a portion of the object to be inspected 18 different from the portion to be inspected 19 so as to be bent along the outer shape of the object to be inspected 18.

Figure 9:
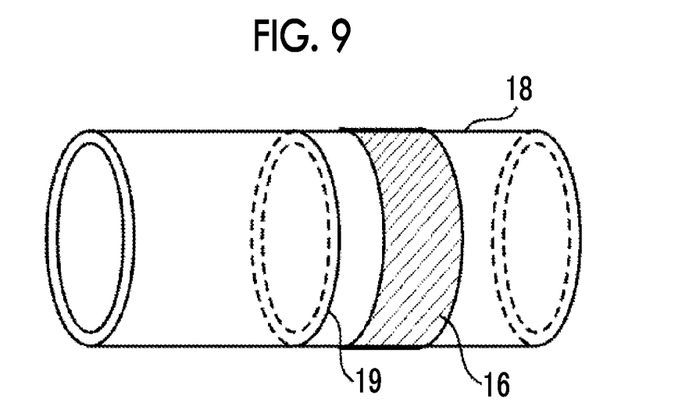
FIG. 9 is a diagram showing an example of a state in which the radiography apparatus according to the embodiment is provided on a portion of the object to be inspected different from the portion to be inspected.

Specifically, an inspector who performs the non-destructive inspection, first, installs the radiography apparatus 16 on a portion of the object to be inspected 18 which is different from the portion to be inspected 19, is as close as possible to the portion to be inspected 19, and is considered to have as few defects as possible from the appearance, by bending the radiography apparatus 16 along the outer shape of the object to be inspected 18. FIG. 9 shows an example of a state in which the radiography apparatus 16 is provided on the portion of the object to be inspected 18 different from the portion to be inspected 19 so as to be bent along the outer shape of the object to be inspected 18. Further, the inspector disposes the radiation irradiation apparatus 12 at a position corresponding to the portion provided with the radiography apparatus 16 inside the portion to be inspected 19 of the object to be inspected 18. For this disposition, for example, an electric trolley or the like is used.

Next, the inspector operates the correction apparatus 14 to input an instruction on capturing the radiographic image. When the capturing instruction is input, the correction apparatus 14 transmits imaging conditions such as a tube voltage, a tube current, and an irradiation period of radiation to the radiation irradiation apparatus 12 and the radiography apparatus 16.

Radiation in accordance with the imaging conditions is emitted from the radiation source 13 of the radiation irradiation apparatus 12. Then, the first image data is generated by the radiation detector 20 according to the amount of radiation which has reached the radiation detector 20 of the radiography apparatus 16. The first image data generated by the radiation detector 20 is transmitted to the correction apparatus 14 through the communication unit 66. As such, the acquisition unit 80 acquires the first image data transmitted from the radiography apparatus 16.

Further, the acquisition unit 80 acquires image data (hereinafter referred to as "second image data") representing a radiographic image generated by the radiography apparatus 16 which is irradiated with radiation in a state of being provided on the portion to be inspected 19 of the object to be inspected 18 so as to be bent along the outer shape of the object to be inspected 18.

Figure 10:
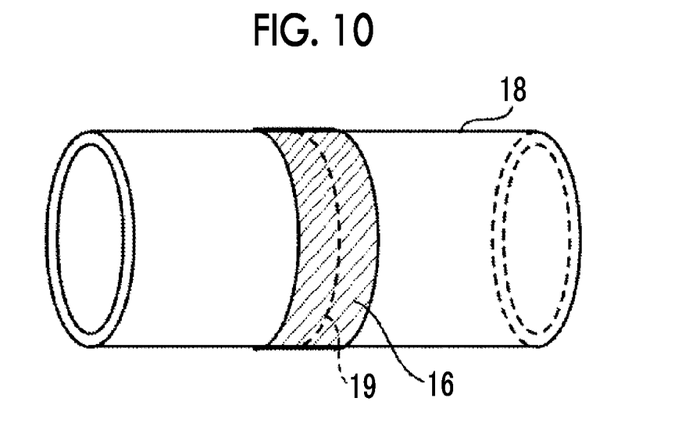
FIG. 10 is a diagram showing an example of a state in which the radiography apparatus according to the embodiment is provided on the portion to be inspected of the object to be inspected.

Specifically, the inspector who performs the non-destructive inspection installs the radiography apparatus 16 on the portion to be inspected 19 of the object to be inspected 18 by bending the radiography apparatus 16 along the outer shape of the object to be inspected 18. FIG. 10 shows an example of a state in which the radiography apparatus 16 is provided on the portion to be inspected 19 of the object to be inspected 18 so as to be bent along the outer shape of the object to be inspected 18. Further, the inspector disposes the radiation irradiation apparatus 12 at a position corresponding to the portion provided with the radiography apparatus 16 inside the portion to be inspected 19 of the object to be inspected 18. Since subsequent processing for acquiring the second image data is the same as the processing for acquiring the first image data, the description thereof will not be repeated.

The generation unit 82 generates correction data 83 for correcting the second image data on the basis of the first image data. Hereinafter, a specific example of generation processing of the correction data 83 will be described with reference to FIG. 11. The horizontal axis of FIG. 11 represents the pixel position of the radiation detector 20 along the outer peripheral direction of the object to be inspected 18, and the vertical axis represents the pixel value.

Figure 11:
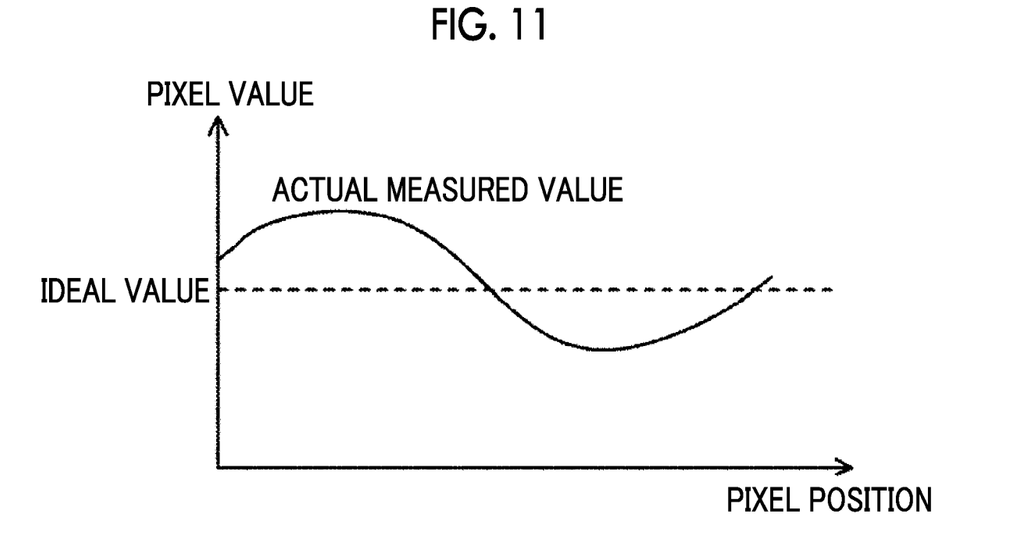
FIG. 11 is a graph for explaining generation processing of correction data.

As shown in FIG. 11, in a case where the radiation source 13 is disposed at the center in the cross-section along the radial direction of the object to be inspected 18, and the sensitivity of each pixel 32 is constant, the pixel value of the pixel 32 at each pixel position along the outer peripheral direction of the object to be inspected 18 is constant. In the present embodiment, the pixel value in this case is referred to as an "ideal value". In the example of FIG. 11, the ideal value is shown by a broken line. In the present embodiment, the ideal value is predetermined according to the information regarding the object to be inspected 18 such as the material, the inner diameter, and the outer diameter of the object to be inspected 18, and the imaging conditions of the radiographic image.

On the other hand, the pixel value of the pixel 32 at each pixel position along the outer peripheral direction of the object to be inspected 18 of the first image data fluctuates depending on the deviation amount from the center of the radiation source 13 in the cross-section along the radial direction of the object to be inspected 18. Further, in a case where the radiation detector 20 is a radiation detector in which a plurality of pixels 32 each of which outputs an electrical signal according to the amount of the emitted radiation are arranged, the density unevenness occurs due to the variation in sensitivity of each pixel and pixel defects. In the present embodiment, the pixel value of the first image data in this case is referred to as an "actual measured value". In the example of FIG. 11, the actual measured value is shown by a solid line. Further, in the example of FIG. 11, when the first image data is obtained, the inspector installs the radiography apparatus 16 on the portion of the object to be inspected 18 having no defect. Therefore, the actual measured value does not include the density unevenness caused by the defect.

However, the actual measured value includes the density unevenness caused by the difference in distance from the radiation source 13 to each pixel 32 of the radiation detector 20 or the variation in sensitivity of each pixel 32. Accordingly, a coefficient for making the actual measured value coincide with the ideal value is set as correction data 83, and the second image data is corrected by using the correction data 83, so that the density unevenness caused by the difference in distance or the variation in sensitivity of each pixel 32 is corrected in the second image data. That is, by using the corrected second image data, the density unevenness caused by the defect can be easily found.

Then, the generation unit 82 calculates the ratio of the ideal value to the actual measured value obtained by dividing the ideal value by the actual measured value for each pixel position along the outer peripheral direction of the object to be inspected 18, and the calculated ratio of the ideal value to the actual measured value for each pixel position is generated as correction data 83. That is, the correction data 83 is data representing the difference in pixel value of the first image data based on the difference in distance from the radiation source 13 or the variation in sensitivity of each pixel 32 in each pixel 32 of the radiation detector 20.

The correction unit 84 corrects the second image data by using the correction data 83. Specifically, the correction unit 84 corrects the second image data by multiplying the pixel value of each pixel of the second image data by the ratio of the correction data 83 corresponding to the pixel position of each pixel. As a result, the density unevenness caused by the difference in distance of the second image data or the variation in sensitivity of each pixel 32 is corrected.

The output unit 86 outputs the second image data corrected by the correction unit 84 to the display unit 93, which will be described later.

Figure 12:
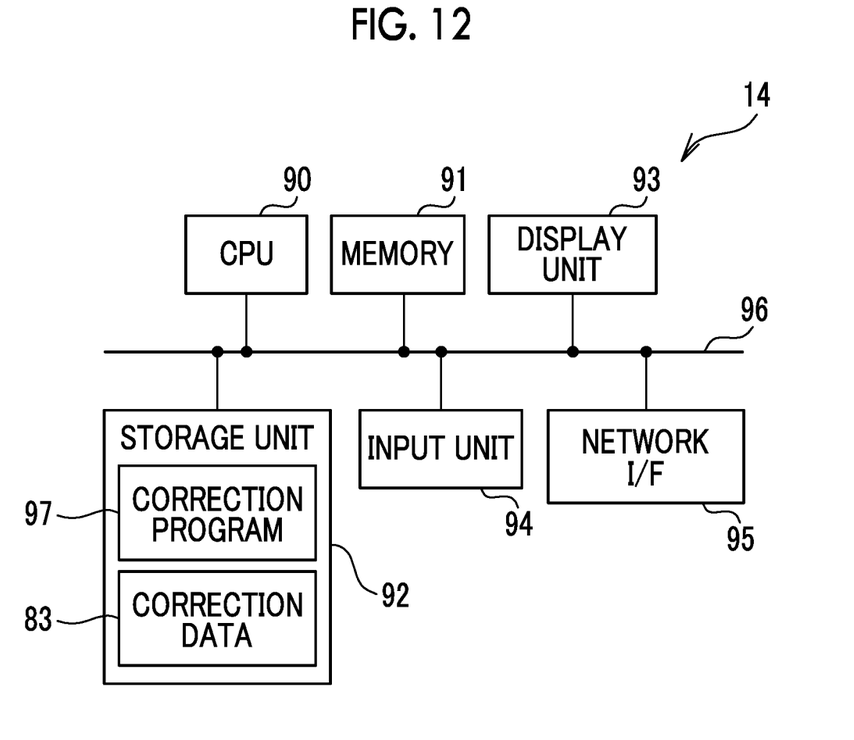
FIG. 12 is a block diagram showing an example of a hardware configuration of the correction apparatus according to the embodiment.

Next, the hardware configuration of the correction apparatus 14 according to the present embodiment will be described with reference to FIG. 12. As shown in FIG. 12, the correction apparatus 14 includes a CPU 90, a memory 91 as a temporary storage area, and a non-volatile storage unit 92. Further, the correction apparatus 14 includes a display unit 93 such as a liquid crystal display, an input unit 94 such as a keyboard, and a network interface (I/F) 95 that controls wireless communication. The CPU 90, the memory 91, the storage unit 92, the display unit 93, the input unit 94, and the network I/F 95 are connected to a bus 96.

The storage unit 92 is implemented with a hard disk drive (HDD), a solid state drive (SSD), a flash memory, and the like. A correction program 97 and the above-mentioned correction data 83 are stored in the storage unit 92 as a storage medium. The CPU 90 reads out the correction program 97 from the storage unit 92, extracts the program to the memory 91, and executes the extracted correction program 97. The CPU 90 executes the correction program 97 to function as the acquisition unit 80, the generation unit 82, the correction unit 84, and the output unit 86 shown in FIG. 8.

Next, the operation of the correction apparatus 14 according to the present embodiment will be described with reference to FIGS. 13 and 14. The CPU 90 executes the correction program 97, and generation processing shown in FIG. 13 and correction processing shown in FIG. 14 are executed.

Figure 13:
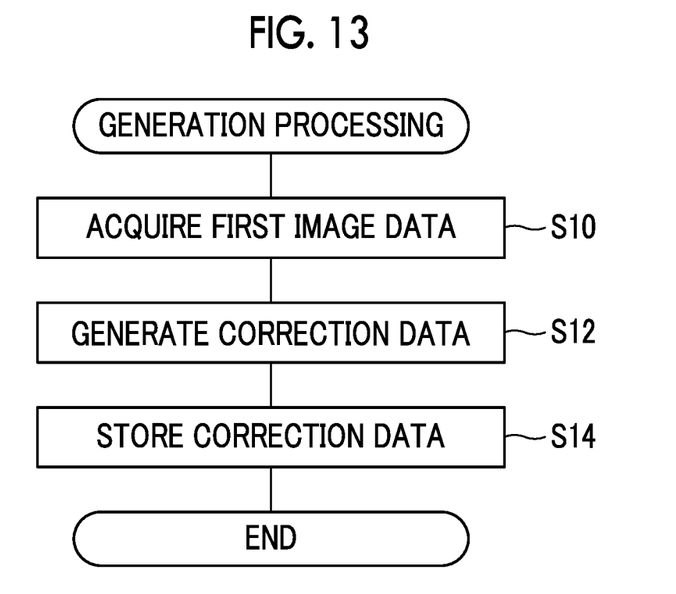
FIG. 13 is a flowchart showing an example of generation processing according to the embodiment.
Figure 14:
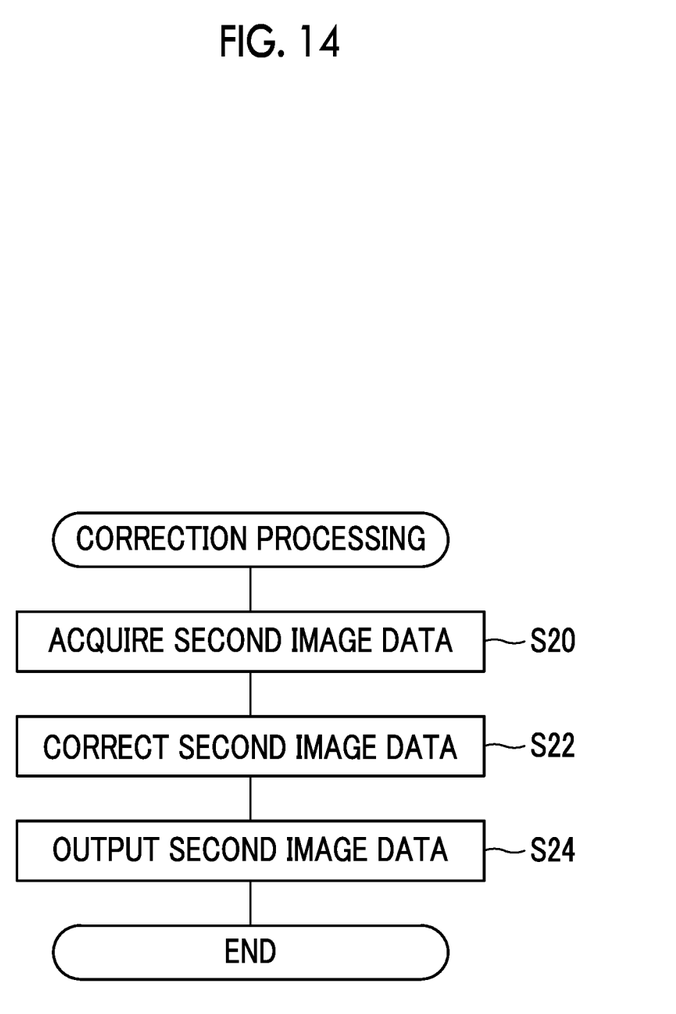
FIG. 14 is a flowchart showing an example of correction processing according to the embodiment.

The generation processing shown in FIG. 13 is executed, for example, in a case where the inspector inputs an instruction on acquiring the first image data through the input unit 94. As described above, the inspector inputs the instruction on acquiring the first image data, that is, the instruction on capturing the radiographic image in a state in which the radiography apparatus 16 is provided on the portion of the object to be inspected 18 different from the portion to be inspected 19 so as to be bent along the outer shape of the object to be inspected 18. As described above, in response to this input, radiation is emitted from the radiation source 13, and the first image data is transmitted from the radiography apparatus 16 to the correction apparatus 14.

In Step S10 of FIG. 13, the acquisition unit 80 acquires the first image data transmitted from the radiography apparatus 16. In Step S12, as described above, the generation unit 82 generates the ratio of the ideal value to the pixel value of the first image data acquired by the processing of Step S10, as the correction data 83.

In Step S14, the generation unit 82 stores the correction data 83 generated by the processing of Step S12 in the storage unit 92. When processing of Step S14 ends, the generation processing ends.

The correction processing shown in FIG. 14 is executed, for example, in a case where the inspector inputs an instruction on acquiring the second image data through the input unit 94. As described above, the inspector inputs the instruction on acquiring the second image data, that is, the instruction on capturing the radiographic image in a state in which the radiography apparatus 16 is provided on the portion to be inspected 19 of the object to be inspected 18 so as to be bent along the outer shape of the object to be inspected 18. As described above, in response to this input, radiation is emitted from the radiation source 13, and the second image data is transmitted from the radiography apparatus 16 to the correction apparatus 14.

In Step S20 of FIG. 14, the acquisition unit 80 acquires the second image data transmitted from the radiography apparatus 16. In Step S22, as described above, the correction unit 84 corrects the second image data acquired by the processing of Step S20 by using the correction data 83 stored in the storage unit 92.

In Step S24, the output unit 86 outputs the second image data corrected by the processing of Step S22 to the display unit 93. By the processing of Step S24, the radiographic image shown by the second image data is displayed on the display unit 93. The inspector visually confirms the radiographic image displayed on the display unit 93 to grasp the presence or absence of defects in the portion to be inspected 19 of the object to be inspected 18.

When the processing of Step S24 ends, the correction processing ends.

As described above, according to the present embodiment, the correction data 83 is generated on the basis of the first image data. Therefore, correction data for correcting the radiographic image generated by the radiation detector can be easily generated.

In the above-described embodiment, the case where the ideal value is predetermined has been described, but the present disclosure is not limited thereto. As the ideal value of the pixel value of the first image data, a value between the maximum value and the minimum value of the pixel values of the first image data may be applied. Specific examples of the ideal value of the pixel value of the first image data include the median value of the pixel values of the first image data.

Further, at least a part of the generation processing shown in FIG. 13 or correction processing shown in FIG. 14 executed by the CPU 90 of the correction apparatus 14 in the above-described embodiment may be executed by the CPU 60 of the radiography apparatus 16.

Further, in the above-described embodiment, the case where the PSS type radiation detector in which the radiation is emitted from the scintillator 22 side is applied to the radiation detector 20 has been described, but the present disclosure is not limited thereto. For example, an irradiation side sampling (ISS) type radiation detector in which radiation is emitted from the TFT substrate 30 side may be applied to the radiation detector 20.

Further, in the above-described embodiment, the case where an indirect conversion type radiation detector that temporarily converts radiation into light and then converts the converted light into electric charge is applied to the radiation detector 20 has been described, but the present disclosure is not limited thereto. For example, a direct conversion type radiation detector that directly converts radiation into electric charge may be applied to the radiation detector 20.

Further, in the above-described embodiment, for example, as a hardware structure of a processing unit that executes various processing such as processing performed by the acquisition unit 80, the generation unit 82, the correction unit 84, and the output unit 86, the following various processors may be used. The various processors include, for example, a programmable logic device (PLD), such as an FPGA, which is a processor having a changeable circuit configuration after manufacture and a dedicated electrical circuit, such as an application specific integrated circuit (ASIC), which is a processor having a dedicated circuit configuration designed to perform specific processing, in addition to the CPU which is a general-purpose processor that executes software (program) to function as various processing units as described above.

One processing unit may be formed by one of the various processors or may be formed by a combination of two or more processors of the same type or different types (for example, a combination of a plurality of FPGAs and a combination of a CPU and an FPGA). Further, the plurality of processing units may be formed by one processor.

A first example of the configuration in which the plurality of processing units are formed by one processor is an aspect in which one or more CPUs and software are combined to form one processor and the processor functions as a plurality of processing units. A representative example of the aspect is a computer such as a client and server. A second example of the configuration is an aspect in which a processor that implements all of the functions of a system including the plurality of processing units with one integrated circuit (IC) chip is used. A representative example of the aspect is a system-on-chip (SoC). As such, the hardware structure of various processing units is formed by using one or more of the various processors.

Specifically, an electrical circuit (circuitry) obtained by combining circuit elements, such as semiconductor elements, may be used as the hardware structure of these various processors.

In the above-described embodiment, the aspect in which the correction program 97 is stored (installed) in the storage unit 92 in advance has been described, but the present disclosure is not limited thereto. The correction program 97 may be recorded on a recording medium, such as a compact disc read only memory (CD-ROM), a digital versatile disc read only memory (DVD-ROM), or a universal serial bus (USB) memory, and then provided. Further, the correction program 97 may be downloaded from an external apparatus through the network.

EXPLANATION OF REFERENCES

- 10: radiography system
- 12: radiation irradiation apparatus
- 13: radiation source
- 14: correction apparatus
- 16: radiography apparatus
- 18: object to be inspected
- 19: portion to be inspected
- 20: radiation detector
- 21: housing
- 22: scintillator
- 26: control substrate
- 28: case
- 30: TFT substrate
- 32: pixel
- 32A: sensor unit
- 32B: thin film transistor
- 34: gate line
- 36: data line
- 52: gate line driver
- 54: signal processing unit
- 56: image memory
- 58: controller
- 60, 90: CPU
- 62, 91: memory
- 64, 92: storage unit
- 66: communication unit
- 70: power supply unit
- 80: acquisition unit
- 82: generation unit
- 83: correction data
- 84: correction unit
- 86: output unit
- 93: display unit
- 94: input unit
- 95: network I/F
- 96: bus
- 97: correction program

What is claimed is:

1. A correction method of correcting a radiographic image generated by a radiation detector that detects radiation with which a portion to be inspected of an object to be inspected is irradiated, and the radiation is transmitted through the object to be inspected, the correction method comprising:
    acquiring first image data representing a first radiographic image generated by the radiation detector, which is irradiated with the radiation in a state of being provided on a portion of the object to be inspected different from the portion to be inspected so as to be bent along an outer shape of the object to be inspected;
    generating correction data on a basis of the first image data; and
    correcting second image data representing a second radiographic image generated by the radiation detector, which is irradiated with the radiation in a state of being provided on the portion to be inspected so as to be bent along the outer shape of the object to be inspected.

2. The correction method according to claim 1, further comprising:
    acquiring the second image data; and
    correcting the second image data by using the correction data.

3. The correction method according to claim 2, wherein the correction data is a ratio of an ideal value of a pixel value of the first image data.

4. The correction method according to claim 3, wherein the correction data is data representing a difference in the pixel value of the first image data based on a difference in a distance from a radiation source in each pixel of the radiation detector.

5. The correction method according to claim 4, wherein the ideal value of the pixel value of the first image data is a value between a maximum value and a minimum value.

6. The correction method according to claim 3, wherein the ideal value of the pixel value of the first image data is a value between a maximum value and a minimum value.

7. The correction method according to claim 1, wherein the correction data is a ratio of an ideal value of a pixel value of the first image data.

8. The correction method according to claim 7, wherein the correction data is data representing a difference in the pixel value of the first image data based on a difference in a distance from a radiation source in each pixel of the radiation detector.

9. The correction method according to claim 8 wherein the ideal value of the pixel value of the first image data is a value between a maximum value and a minimum value.

10. The correction method according to claim 7, wherein the ideal value of the pixel value of the first image data is a value between a maximum value and a minimum value.

11. A correction apparatus that corrects a radiographic image generated by a radiation detector that detects radiation with which a portion to be inspected of an object to be inspected is irradiated, and the radiation is transmitted through the object to be inspected, the correction apparatus comprising:
    an acquisition unit including a processing circuit that acquires first image data representing a first radiographic image generated by the radiation detector, which is irradiated with the radiation in a state of being provided on a portion of the object to be inspected different from the portion to be inspected so as to be bent along an outer shape of the object to be inspected; and
    a correction unit including a processing circuit that generates correction data on a basis of the first image data and corrects second image data representing a second radiographic image generated by the radiation detector, which is irradiated with the radiation in a state of being provided on the portion to be inspected so as to be bent along the outer shape of the object to be inspected.

12. A radiography system comprising:
    a radiation detector including a plurality of pixels each of which outputs an electrical signal according to an amount of emitted radiation are arranged; and
    a correction apparatus according to claim 11.

13. The radiography system according to claim 12, wherein each of the plurality of pixels includes a conversion element that generates a larger amount of an electric charge as the amount of emitted radiation becomes larger, and a switching element that outputs the electric charge generated by the conversion element as the electrical signal.

14. A non-transitory computer readable recording medium storing a correction program that causes a correction apparatus that corrects a radiographic image generated by a radiation detector that detects radiation with which a portion to be inspected of an object to be inspected is irradiated, and the radiation is transmitted through the object to be inspected, to execute a process, the process comprising:
    acquiring first image data representing a first radiographic image generated by the radiation detector, which is irradiated with the radiation in a state of being provided on a portion of the object to be inspected different from the portion to be inspected so as to be bent along an outer shape of the object to be inspected;
    generating correction data on a basis of the first image data; and
    correcting second image data representing a second radiographic image generated by the radiation detector, which is irradiated with the radiation in a state of being provided on the portion to be inspected so as to be bent along the outer shape of the object to be inspected.

* * * * *